Dec. 31, 1968   E. P. MORRIS   3,418,727
VENEER DRYER
Original Filed Sept. 21, 1964   Sheet 1 of 7

INVENTOR.
EDWARD P. MORRIS
BY

ATTORNEYS

FIG. 3A

INVENTOR.
EDWARD P. MORRIS
BY

ATTORNEYS

FIG. 4A

INVENTOR.
EDWARD P. MORRIS
BY
ATTORNEYS

FIG. 5

United States Patent Office 3,418,727
Patented Dec. 31, 1968

3,418,727
VENEER DRYER
Edward P. Morris, Painesville, Ohio, assignor to The Coe Manufacturing Company, Painesville, Ohio, a corporation of Ohio
Original application Sept. 21, 1964, Ser. No. 397,886, now Patent No. 3,334,421, dated Aug. 8, 1967. Divided and this application June 12, 1967, Ser. No. 645,371
3 Claims. (Cl. 34—155)

ABSTRACT OF THE DISCLOSURE

An apparatus for drying material in sheet form, especially veneer and like material which is relatively light and apt to be warped or otherwise irregular in shape and/or to become so, or more so, during drying, which apparatus has a plurality of chambers arranged in tandem and through a plurality of which chambers material is conveyed by discrete endless conveyors including conveying and hold-down members.

Related application

This application is a division of my co-pending application, Serial No. 397,886, filed Sept. 21, 1964, now Patent No. 3,334,421, entitled "Veneer Dryer," and the disclosures of said application including the specification, drawings, etc. thereof are incorporated herein by reference.

The principal object of the invention is the provision of a novel and improved method of and apparatus for drying veneer wherein the veneer is conveyed through a plurality of elongated chambers, arranged in tandem, between endless conveyors and hold-down members while both sides of the material are impinged by a gaseous medium, preferably air, moving at relatively high velocities.

Another object of the invention is the provision of a novel and improved apparatus for drying veneer comprising a plurality of chambers through which veneer is moved sequentially in a generally horizontal path by a plurality of separate or discrete conveyors of the endless belt-type comprising a plurality of cables, having a reach disposed at the lower side of the path for supporting the veneer and a reach thereabove for holding the veneer on the first-mentioned reach and, preferably including rollers driven by a common sprocket chain drive engaging underneath the veneer supporting reach and the veneer hold-down return reach, in combination with means for circulating a gaseous medium, preferably air, around and about the veneer.

The invention resides in certain constructions and combinations and arrangements of parts, and further objects and advantages will be apparent to those skilled in the art to which the invention relates from the following description of the preferred equipment or apparatus for practicing the invention described with reference to the accompanying drawings forming a part of this specification and in which:

Although the illustrative equipment will be described in detail, it is to be understood that the invention is not limited to the use of equipment having the construction and arrangement of the parts shown and described, but is capable of being otherwise practiced and carried out in various ways. It is also to be understood that the phaseology or terminology employed herein is for the purpose of description and not of limitation, and that there is no intention to thereby limit the invention beyond the requirements of the prior art.

Referring to the drawings, the preferred apparatus shown is a two-deck dryer for simultaneously drying two continuous sheets of green veneer moving through the dryer in linear paths one spaced above the other. The dryer, as shown, comprises two enlongated dryer units A and B arranged in tandem each including an enclosure or housing 10 of rectangular cross-sectional shape the lower central portion of which constitutes an elongated chamber through which veneer is caused to travel sequentially along vertically spaced, horizontal paths from left to right, as viewed in FIGS. 1 and 2, on two tiered conveyor means or conveyer systems E and F. From the discharge end of unit B the veneer travels through a cooling unit C. A suitable transfer unit or section D is interposed intermediate the adjacent ends of the units A and B to transfer the veneer from unit A to unit B.

Since each of the two dryer units A and B and the two conveying systems E and F are essentially duplicates of one another, only the dryer unit A and the upper conveyor or conveyor system E will be described in detail. The duplicate parts of the dryer unit B will be designated by the same reference characters as dryer A with the suffix B added thereto and the duplicate parts of the lower conveyor system F will be indicated by adding a prime mark to the corresponding reference numeral in conveyor E having prime marks applied thereto.

The housing 10 of dryer unit A is substantially rectangular in cross section and comprises a frame made up of suitable structural members, etc. welded and/or bolted together. The exterior of the housing is sheet metal or like material and includes a plurality of access doors designated generally by reference characters 11 along opposite sides of the unit A. In the particular embodiment shown, dryer unit A has the interior thereof divided into a plurality or a series of compartments by transverse vertical partitions 12 except for the central chamber H through which the conveyors extend. If desired, however, the vertical partitions 12 can extend entirely across the unit A and have openings in the central portion thereof to permit the passage therethrough of the necessary parts of the conveyor systems E and F, etc. As a third alternative, the partitions 12 can extend only through the upper section of unit A, that is, the section above a longitudinally extending horizontal partition 13 above the drying chamber H. The horizontal partition 13, the vertical partitions 12, the upper side or roof of unit A, and portions of the sides of unit A together define a plurality of heating compartments G. Each of the heating compartments has associated with it four fan assemblies 16, one heater unit 18, and one damper controlled vent stack 20.

Dividing the dryer unit into a plurality of compartments each having its own air circulating mechanism, permits different temperature zones to be established along the unit, preferably with the highest temperature zones at or near the entrance end of the unit and the other zones having progressively lower temperatures with the lowest temperature zone at the exit end of the unit. While the unit A is described as divided into compartments each having four fan assemblies, one heating unit, and one vent stack, it will be understood that the partitions may be spaced farther apart or closer together and that any division of compartments thus formed may have any suitable number of fans, etc., and any desired arrangement thereof, etc.

The fan assemblies 16 each consist of a motor 24 supported on the top of the dryer unit adjacent to one side thereof by suitable adjustable support means or mounting 26. Output shaft 28 of the motor 24 carries drive pulley 30 on the outer end thereof and a drive belt 32 is trained about pulley 30 and about a driven pulley 34 secured on a horizontal shaft 36 therebelow which shaft extends into the heating chamber G and carries a fan 38 on the end opposite pulley 34. A limited amount of outside air is admitted to the heating compartment G adjacent to the hub of the fan 38 by a frustoconical conduit 40 concentric with the shaft 36 and extending from an opening 41 in the side wall 42 of the dryer unit and terminating near the hub of the fan. A suitable damper can be provided, if desired, for controlling the amount of outside air admitted through inlet pipe 40 into the heating compartment G. Shaft 36 is supported for rotation by means of a base 43 carrying bearings 44 disposed within the frustoconical inlet pipe 40.

Figure 1:
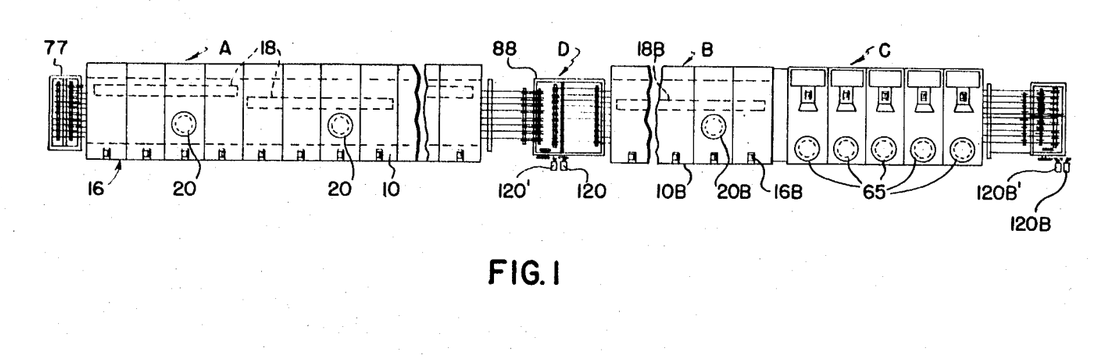
FIG. 1 is a top plan view with parts broken away of a veneer dryer embodying the present invention.

The particular heater units 18 disclosed are steam coils and, in the embodiment shown, the heater units in alternate compartment G are offset from one another transversely of the length of the dryer unit, as clearly illustrated in FIG. 1.

The drying chamber H located in the lower central portion of unit A and through which portions of the conveyors E and F extend is defined in part by a plurality of vertically disposed frame structures 46 and 47 which are spaced inward of opposite sides 42 and 48 of the dryer unit and which extend from the heating compartment G to the floor of unit A. These frame members along with the horizontal partition 13 and floor of unit A form an elongated section or chamber generally rectangular in cross section and which represents the drying chamber H. The space between the frame structures 46, 47 and sides 42, 48 of unit A form two air circulating ducts I and J, respectively. Duct J is in communication with the air discharge end of heating compartment G and the right hand side of the drying chamber H which is arbitrarily designated the air inlet side. Circulating duct I is in communication with the opposite or air inlet end of heating compartment G and the arbitrarily designated outlet side of the drying chamber H.

A plurality of discrete elongated conduit means 49, 50, 51, and 52 extend transversely of the length of drying chamber H and are removably supported at their respective ends by the frame structures 46 and 47 each of which comprise suitable vertical and horizontal structural members such as angle beams, etc. The conduits illustrated are generally rectangular in cross section having one of their ends open and decrease in cross sectional area from their open ends to their other ends which are closed. Each conduit is preferably removably supported by the vertical frames 46 and 47 in a manner so that they can be rapidly removed from their supported positions for repair, etc. The conduits 49, 50, 51 and 52 are positioned in the drying chamber H in four vertically spaced rows; the two top rows 49 and 50 cooperating with the upper conveyor system E and the two lower rows 51 and 52 cooperating with the lower conveyor system F. The conduits of the upper and lower rows associated with each conveyor system are arranged in pairs and are identical except that the conduits 50 and 52 of the lower rows of conduits are inverted relative to the conduits 49 and 51 of the upper rows such that the pair presents opposing horizontal sides 53 vertically spaced from one another a distance sufficient to permit passage of the veneer and parts of the conveying means or systems therebetween. The opposing surfaces of the adjacent sides 53 are relatively even and each side is provided with a row of apertures 56 extending therethrough surrounded by inwardly projecting collars 58.

The air discharge nozzles including the apertures 56 and their surrounding inwardly extending projections 58 are arranged to direct air from the interior of the air ducts or conduits at relatively high velocity against opposite sides of the veneer. The configuration of the air ducts is preferably such as to produce an even or uniform distribution of the drying medium across the surface of the veneer. The spent air drifts or moves to the outlet side of the drying chamber and flows into circulation duct I.

The entrance or open ends of the air ducts 49, 50, 51 and 52 are detachably secured to plates 60 which in turn are connected to and supported by the members of the frame structure 47 in such a manner so as to form a solid wall at the inlet side of the drying chamber H except for the openings in the air ducts. Any suitable arrangement of baffles within the air ducts and/or apertures 56 in sides 53 can be employed to obtain any desired variety of air distribution patterns for drying the material.

Figure 5:
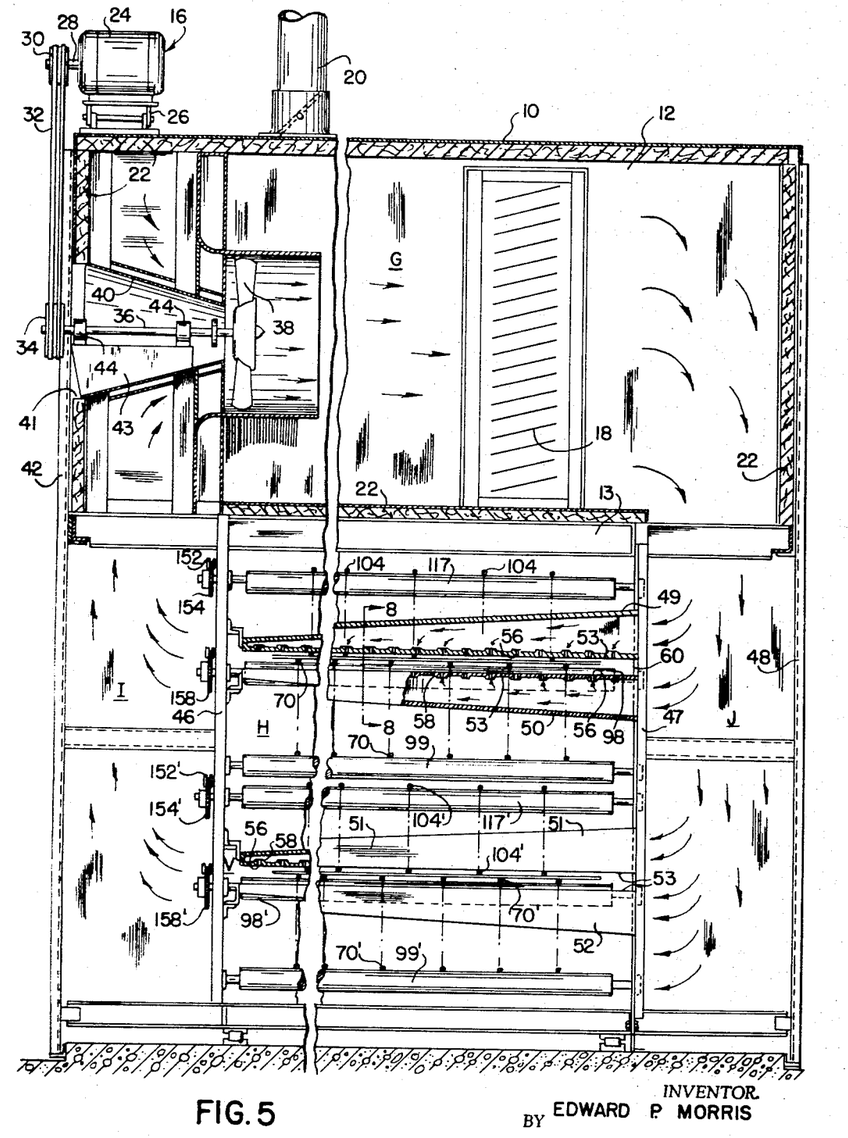
FIG. 5 is an enlarged sectional view of the dryer shown approximately on the line 5—5 of FIG. 2.

The air circulation pattern in unit A is indicated by arrows in FIG. 5. Fans 38 drive or force air through the steam coils 18 in the heating compartments G and from the heating compartments into circulation duct J from which the air flows into the open ends of conduits 49, 50, 51 and 52. From these conduits the air is discharged through the nozzles 58 onto opposite sides of the veneer and thereafter drifts into circulation duct I to be drawn into the heating compartments G where the circulation cycle is repeated. The openings 41 and conduits or pipes 40 provide for the intake of cool air from the outside to mix with the air within the unit.

Figure 2:
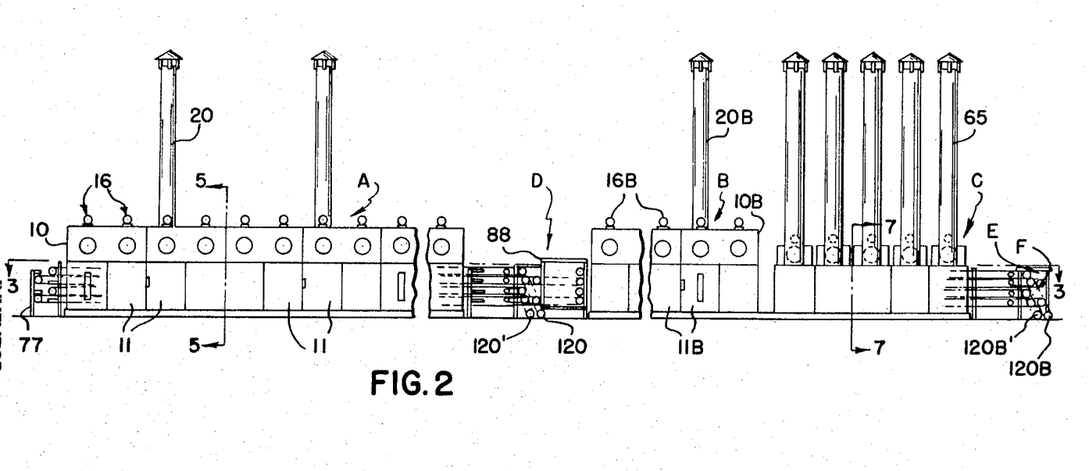
FIG. 2 is a side elevational view with parts broken away of the veneer dryer shown in FIG. 1.
Figures 6, 7, 8:
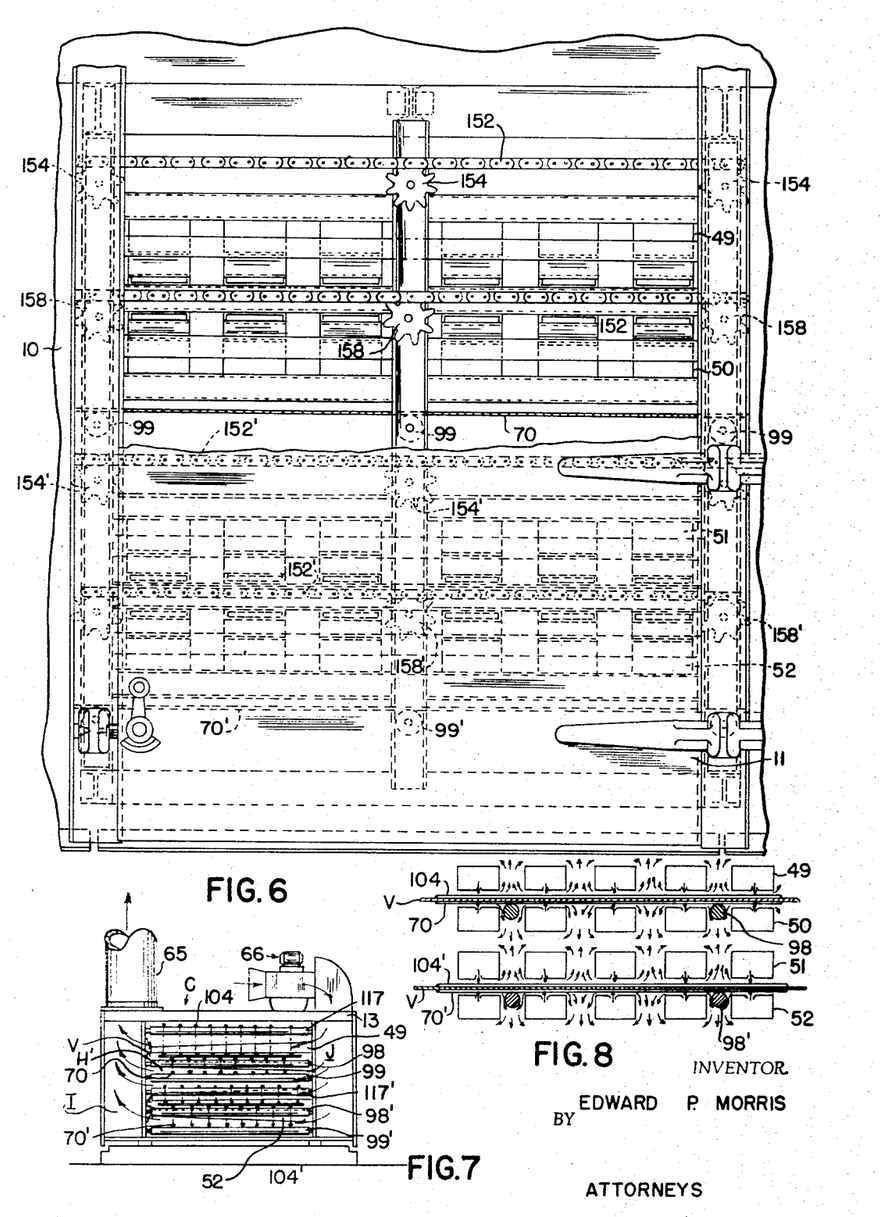
FIG. 6 is a fragmentary side elevational view of the dryer as viewed from the left-hand side of FIG. 5.
FIG. 7 is a diagrammatic cross-sectional view of the cooling chamber of the dryer taken substantially along line 7—7 of FIG. 2.
FIG. 8 is a fragmentary view of the dryer taken substantially along line 8—8 of FIG. 5 illustrating the flow of the drying medium about the veneer being dried.

The construction of the cooling unit C is generally similar to that of the dryer units except for the omission of the heater units which are not required since the air circulating through the cooling chamber is not heated. The air ducts or conduits therein corresponding to the air ducts or conduits 49, 50, 51, 52 employed in units A and B could, however, be omitted, if desired. Referring particularly to FIGS. 1, 2 and 7, air is circulated through the cooling chamber by five blower units designated generally as 66 each of which forces outside air through the cooling chamber transversely of the length thereof, the air first passing through the inlet circulating duct J then through the cooling chamber N in which the conveyor systems extend and out through duct I adjacent to the left-hand side of the cooling chamber as viewed in FIG. 7 and a vent stack 65. The vent stack 65 is generally similar to the vent stacks 20 of the dryer units. Since the air circulated through unit C is not heated the heating compartments employed in units A and B are omitted and the fan units 66 and the vent stacks 65 are supported on the top of the cooling chamber N which conforms to that of the partition 13 of the units A and B.

As previously stated, the conveyor systems E and F extend lengthwise through the drying chambers H and H′ of the dryer units A and B and are disposed relative to one another in a tiered relationship with the veneer being conveyed through the separate or discrete drying chambers H and H′ in a plurality of vertically spaced, generally horizontal paths located between the opposite sides of the air ducts or duct means associated with the respective conveyor systems. Only conveyor system E, as previously stated, is being herein described in detail.

Conveyor system E comprises an entrance or first conveyor assembly K associated with dryer unit A, an exit or second conveyor assembly L associated with dryer unit B and a transfer conveyor assembly M. The entrance conveyor assembly K, as shown, includes an endless conveyor having lower and upper endless belt-like sections 67 and 68, respectively, extending through the drying chamber H of dryer unit A, each comprising a plurality of endless members, in the present instance wire cables 70, reeved or trained about suitable support means at or adjacent to opposite ends of the unit A. The upper reach of the lower endless belt-like section 67 supports and conveys the veneer V through the drying chamber H of unit A and this section is hereinafter sometimes referred to as the conveyor section or reach. The lower reach of the upper endless belt-like section 68, rests upon the veneer being conveyed or carried through the drying chamber H of unit A by the conveyor section 67 and assist in or holds the veneer on the upper reach of the conveyor section and is hereinafter sometimes referred to as the holddown section or reach.

The cables 70 of the lower section 67 are reeved about rotatable support means 71, 72 at or adjacent to the entrance and exit ends of the unit A, respectively. In the embodiment shown the support means 71 includes a plurality of pulleys 73 spaced transversely of one another along shaft 74 supported in suitable bearing means 75 and 76 located on an entrance frame section 77 of the dryer unit A at the entrance end of the unit. The number of pulleys 73 correspond to the number of endless conveying members 70 and for the purpose of illustration ten have been shown. The rotatable support means 72 located adjacent to the exit end of dryer unit A comprises, in the illustrated embodiment, a plurality of pulleys 82 fixed on a shaft 84 which shaft is in turn rotatably supported in suitable bearing means 86 and 87 on the drive frame section 88 of the dryer unit A. Each of the pulleys 82 of the rotatable support means 72 have a plurality of cable guides or grooves to maintain the cable passes trained thereover separated.

Figure 3A:
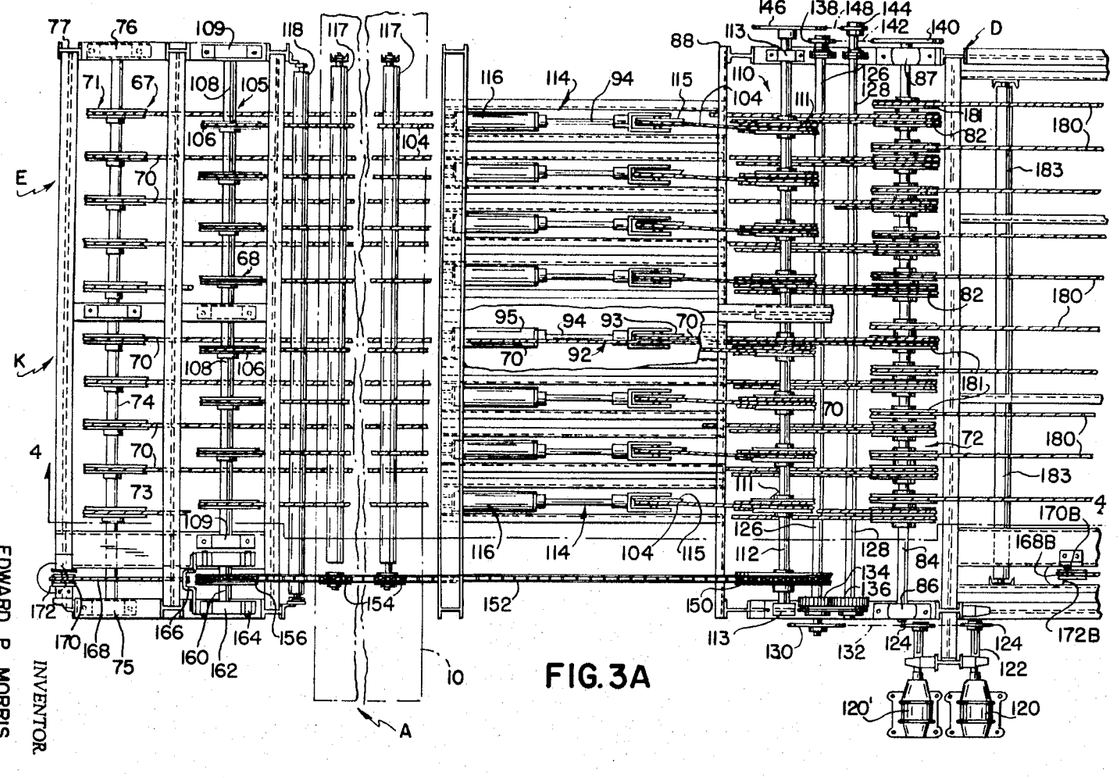
FIGS. 3A and 3B together are an enlarged fragmentary sectional view of the veneer dryer shown approximately on the line 3—3 of FIG. 2.
Figure 3B:
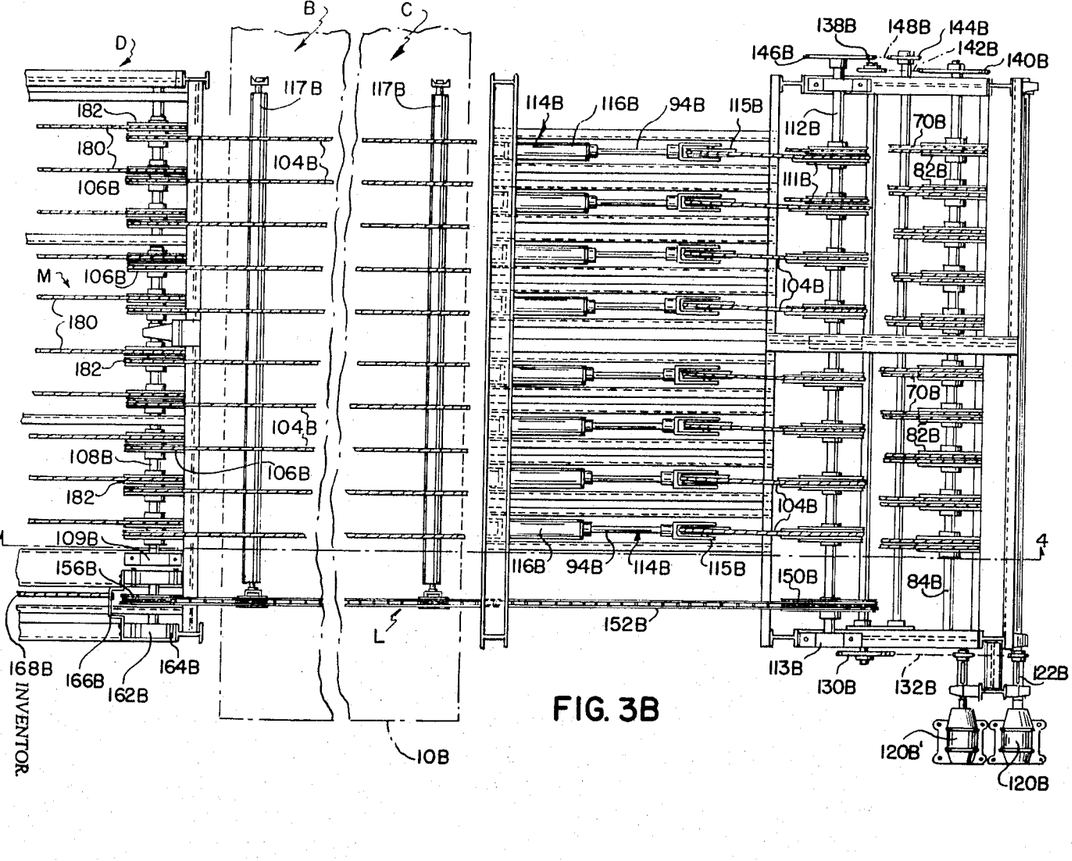

Each of the cables 70 is provided with a discrete takeup means 92 located intermediate the rotatable support member 72 and the exit end of housing 10 of dryer unit A. Each of the particular takeup means illustrated comprise a pulley 93, around which the cable 70 which it maintains taut is reeved. The pulleys 93 are connected to the end of piston rods 94 of piston-cylinder assemblies 95 pivotally connected to a cross member of the frame 88 and suitable for having a predetermined fluid pressure maintained therein and in turn for maintaining a predetermined tension on the cables 70. Each piston-cylinder assembly 95 has fluid under pressure supplied to it in a well known manner to maintain a predetermined pressure therein for biasing the piston rod 94 and in turn pulley 93 towards the left, as viewed in FIGS. 3A and 4A. Although hydraulic fluid pressure-type takeup means has been illustrated it is to be understood that other suitable takeup means can be utilized without departing from the spirit of the invention. For example, a discrete gravity type of takeup means may be used with each endless member 70 for maintaining desired tensions on the respective members. To incorporate such a gravity takeup system for each of the endless members would necessitate mounting the pulleys of one of the rotary support means 71, 72 so as to be adjustable lengthwise of the dryer unit A. A suitable means such as cables would have to be provided to connect the pulleys and weights and these cables would have to be fed either outwardly of the paper or into the paper, as viewed in FIGS. 4A and 4B, so as not to interfere with the conveyor system and veneer.

A plurality of transversely extending rolls 98 are provided throughout the length of the dryer unit A for supporting the upper or conveying reaches of the cables 70. The ends of the rolls 98 are rotatably supported in suitable bearing means on the frame assemblies 46 and 47. Each of the endless conveying members 70 is trained over or reeved about one of the pulleys 73 of the rotatable support means 71. From the rotatable support member 71 the upper reach of the members or cables 70 extend lengthwise through the drying chamber H of housing 10 of dryer unit A in a horizontal direction over the rolls 98 and out through the exit end of the dryer unit where they are trained over and are reeved about the rotatable support means 72 being positioned in one of the guide grooves of the pulleys 82. From the pulleys 82 the cables extend around one of the pulleys 93 of its associated takeup means 92 and back around second cable guide grooves in the pulleys 82 and then back through the drying chamber H of unit A, over support rolls 99 similar to the rolls 98, and continue around the pulleys 73 of the rotatable support means 71. Each endless member or cable 70 forms a continuous loop disposed in a substantially vertical plane. The upper reaches or part of the cables, that is, the portions of the cables 70 extending between the pulleys 73 of the rotatable support means 71 and pulleys 82 of the rotatable support means 72 form the conveying reach of the lower endless conveyor section 67 of the entrance of first conveyor assembly K of the conveyor system E. Those parts of the cables 70 which continue around the pulleys 82 of the rotatable support means 72 and around pulleys 93 of the takeup means 92 then back to and around the pulleys 82 and then return to the pulleys 73 of the rotatable support means 71 complete the closed cable path and form the return reach of the conveyor section 67.

The endless belt-like hold-down section 68 of the conveyor assembly K of the conveyor system E is similar to the conveyor section 67 and comprises a plurality of endless hold-down members which, in the preferred embodiment shown, are cables 104 spaced transversely from one another and extending lengthwise through the dryer unit A. The endless hold-down members are supported at the entrance end of unit A by a rotatable support means 105 comprising a plurality of idler pulleys 106 spaced along and journaled on shaft 108 which in turn is supported by suitable bearing means 109 on the entrance frame section 77. Shaft 108, in the embodiment shown, is disposed above and to the right of shaft 74 as viewed in FIG. 4A for a purpose to be described hereafter. Then endless hold-down cables 104 are supported at their other ends by a rotatable support means 110 comprising a plurality of pulleys 111 spaced along and fixed to a driven shaft 112 supported by suitable bearing means 113 in framework 88. A plurality of hydraulically actuated takeup means 114 are provided for each endless hold-down member 104 which takeup means are similar to the takeup means 92 previously described in connection with the endless conveying member 70 and have pulleys 115 connected to the ends of the piston rods of piston-cylinder assemblies 116. A plurality of rolls 117 are provided in the drying section of dryer unit A similar in structure to rolls 98 or 99 and which engage underneath and support the upper or return reach of the endless hold-down members 104. An idler hold-down roll 118 is provided for the endless hold-down members 104 adjacent to the entrance of the drying section H of unit A.

The endless hold-down members 104 are reeved over or about pulleys 111 of the rotatable support means 110 and then extend through the drying chamber H passing over rolls 117 to pulleys 106 of rotatable support means 105. The cable extends over and around pulleys 106 under idler hold-down roll 118 and through the housing 10 to pulleys 111 of the rotatable support means 110. The cables 104 extend around pulleys 111 over and around pulleys 115 of the takeup assemblies 114 and back to pulleys 111 to complete a circuitous cable path to thereby form a plurality of continuous loops disposed in horizontally spaced substantially vertical planes. Each hold-down member 104 has a hold-down reach which extends from the bottom side of pulley 106 passing under hold-down roll 118 through the drying chamber H of dryer unt A and to a point where the member 104 begins to wrap around pulley 111 and a return reach which extends from the termination point of the hold-down reach on pulley 111 and continues thereover and over and around takeup pulley 115, back around and over pulley 111, back through the drying section H of dryer unit A passing over rolls 117 and around pulley 106 to the point of initiation of the hold-down reach. The hold-down reaches of the members 104 are preferably offset on the horizontal direction transversely of the length of unit A from the conveying reaches of the members 70, as is illustrated in FIG. 5, so as to engage different portions of the opposite surfaces of the veneer. The hold-down reaches are supported through the dryer on the veneer and in absence of veneer, rest on rollers 98.

Figure 4A:
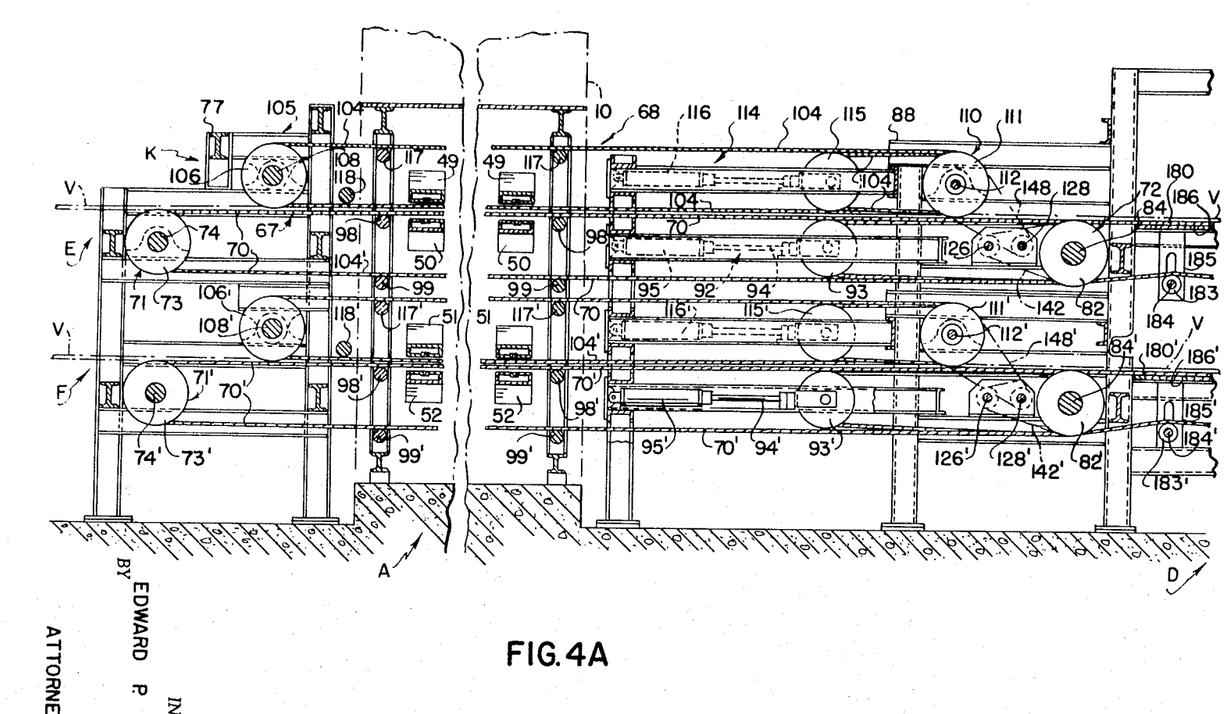
FIGS. 4A and 4B together are an enlarged sectional view of the dryer shown approximately on the line 4—4 of FIGS. 3A and 3B.
Figure 4B:
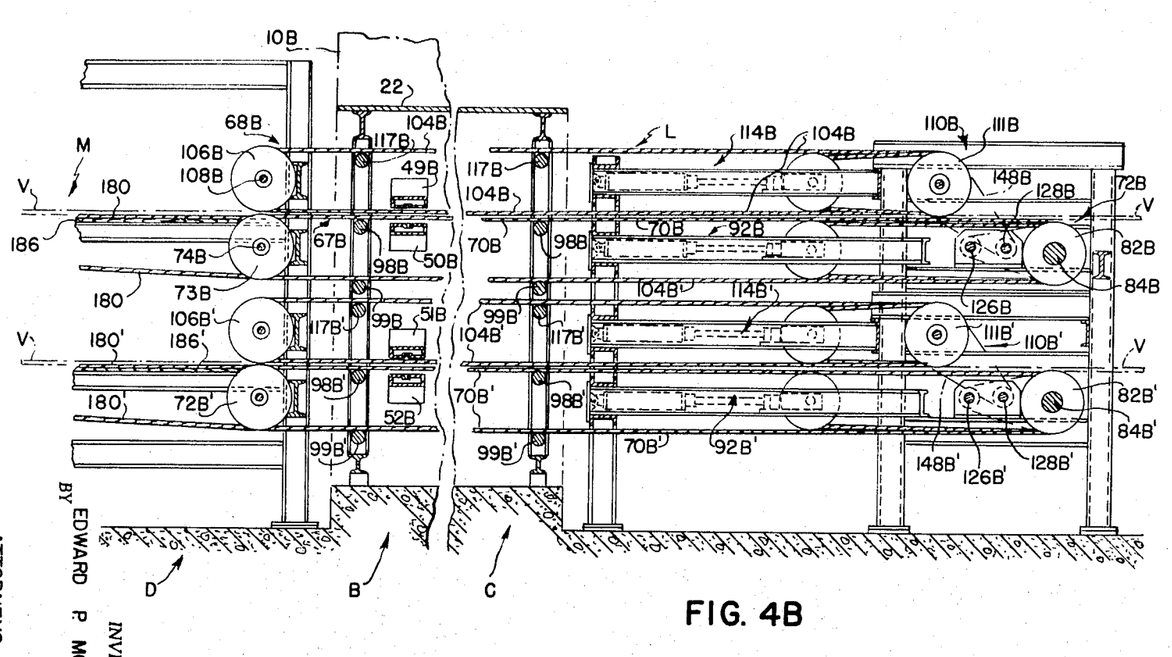

The veneer V to be dried is introduced at the left-hand end of dryer unit A, as viewed in FIG. 4A, between the conveying reaches of the conveying members 70 and the hold-down reaches of the endless hold-down members 104 and is conveyed by the endless conveyor comprising the conveying and hold-down members 70 and 104 through dryer unit A and into the transfer unit D. A veneer feed area is provided at the entrance end of unit A by the spacing of the support means 105 inwardly of or to the right of the support means 71. This arrangement provides an open area so that the veneer can be fed onto the conveying reaches of cables 70 before passing under the hold-down cables 104.

An independent drive means is provided for the conveyors of each of the conveyor systems E and F so that two types of veneer can be conveyed, if desired, simultaneously at different speeds through the dryer unit A to accommodate the different drying times required by each type of veneer. The drying time of a particular veneer is dictated by its characteristics such as, type of wood, moisture content, etc. Since the drive means for the conveyors of each of the conveyor systems E and F are identical, only the drive means for conveyor system E will be described in detail.

The drive means for conveyor system E comprises a variable speed motor 120 having an output shaft 122 with a drive pulley or sprocket 124 located on the outer end thereof. A pair of shafts 126 and 128 are supported adjacent to shaft 84 in suitable bearings in frame 88. Drive shaft 126 has a sprocket 130 located on the end thereof adjacent to the motor 120 and which is connected to sprocket 124 by a sprocket chain 132. Spaced inwardly from pulley 130 is a gear 134 fixed on shaft 126 and in driving engagement with a gear 136 fixed on the adjacent end of shaft 128. The other end of shaft 126 has a sprocket 138 connected to a sprocket 140 on shaft 84 by a sprocket chain 142. Shaft 128 has a sprocket 144 fixed on the end opposite the gear 136 and which is connected to a sprocket 146 on shaft 112 by means of a sprocket chain 148. The drive for cables 70 is transmitted from motor 120 to shaft 126 which in turn drives shaft 128 through gears 134 and 136. Shafts 126 and 128 in turn drive shafts 84 and 112, respectively, in opposite directions.

The rolls 98 and 117 may or may not be driven as desired. In the embodiment shown they are driven in opposite directions by means of a drive sprocket 150 secured on the motor side or end of shaft 112, which drive sprocket has a driving sprocket chain 152 trained thereover. The upper reach of the sprocket chain 152 engages and passes over sprockets 154 fixed on the shafts of rolls 117 and then over and around an idler sprocket 156 supported on entrance frame section 77. Chain 152 extends around sprocket 156 and returns to drive sprocket 150, over drive sprockets 158 fixed on the shafts of rolls 98, as illustrated in FIG. 6. The driving chain engages sprockets 154 and 158 in opposite runs so as to impart opposite directions of rotation to rolls 117 and 98, respectively.

A gravity takeup means is provided for sprocket chain 152 by supporting the idler sprocket 156 on a stub shaft 160 journalled in bearings 162 which in turn are supported on horizontal frame members of frame section 77 to permit sliding movement thereof relative to the frame. A pair of straps 164 are provided for each bearing which extend over the bearings 162 in such a manner as to permit movement of the bearings 162 relative to the frame lengthwise of the sprocket chain but prevent lateral shifting relative to the frame. A member 166 interconnects the left-hand ends of bearing members 162 as viewed in FIG. 3A and has a central position which receives a cable 168. The cable 168 extends towards the left from member 166 and passes over a pulley 170 supported on the rear of frame 77. The end of the cable 168 is connected to a suitable weight 172. The takeup means described exerts a tension on chain 152 commensurate with the weight of the weight 172.

The conveyor assembly L of the conveyor system E associated with dryer unit B is similar to the conveyor assembly K associated with dryer unit A and has an endless conveyor comprising a plurality of endless conveying and hold-down members 70B and 104B, respectively, arranged and driven in a manner similar to the endless conveying members 70 and hold-down members 104 of dryer unit A and will not be described in detail. The principal, if not the only, distinction between these conveyor assemblies is that the rotatable support shafts 74B and 108B for the endless members 70B and 104B, respectively, at the entrance end of unit B are disposed in vertical alignment rather than being offset as are the corresponding shafts 74 and 108 of conveyor assembly K. Aside from the differences noted, the arrangement of parts are identical and functions are identical reference numbers are applied to corresponding parts of each of the conveyors and conveyor assemblies with the addition of the letter B to the reference numbers applied to the conveyor assembly L to indicate that it is a part of dryer unit B.

Veneer emerging from the discharge end of the dryer unit A is transferred and fed into the entrance end of the dryer unit B by the transfer section D which comprises a plurality of endless members, in the present instance, cables 180, reeved about pulleys 181 detachably fixed to the shaft 84 of the rotatable support member 72 at the discharge end of unit A and pulleys 182 detachably fixed to the shaft 74B of the rotatable support means 71B at the entrance end of unit B. Provision is made for adjusting the tightness with which the respective cables 180 engage the pulleys 181 and 172 about which they are reeved in the form of idler sheaves or pulleys 183 rotatably supported on stud shafts 184 supported for vertical adjustment on plates 185. The lower reaches of the cables 180 extend and engage over the respective pulleys 183 with which they are associated and adjustment of the pulleys vertically adjusts the tension on the cables. The upper reaches of the cables 180 are, in the embodiment shown, prevented from sagging by a piece of plywood 186 placed underneath the upper reaches of the cables and over which the upper reaches of the cables travel. The plywood is suitably supported in the frame of the transfer section D.

The motors 120, 120B employed to drive the conveyors of the respective assemblies K and L of the conveyor system E must be such that the respective conveyors are driven at identical speeds otherwise there is danger of the veneer splitting or being otherwise damaged as it is transferred from one conveyor to the other. In the embodiment shown the cables 180 maintain the conveyors traveling at the same speed if their speeds tend to vary.

Some of the advantages in constructing the apparatus as separate units connected by a transfer unit, such as the units A and B connected by the transfer unit D, is the lack of transfer of heat from one treating zone to another by the conveyor system or systems and the ability to use the units separately or individually. The use of different or discrete conveyors in respective treating chambers, such as, the cables 70 and 104 in treating chamber H and cables 70B and 104B in treating chamber H' avoids the transfer of heat from chamber H to chamber H' by the conveyor system. In the event either unit A or unit B is operated without the other the pulleys about which the transfer cables 180 are reeved of the inoperative unit must be freed from their supporting shaft. Suitable clutches can be employed, if desired, to detachably connect the pulleys 181 and 182 to their respective supporting shafts.

From the foregoing description of the preferred embodiments of the invention, it will be apparent that the objects which were enumerated and others have been accomplished and that there has been provided a novel and improved endless conveyor-type apparatus adapted for drying veneer having separate or discrete conveyors for separate treating chambers of the apparatus and wherein air or other gaseous medium is forced against opposite sides of the material in the form of jets at high velocity. While the preferred embodiment of the invention has been described in detail it is understood, as previously stated, that the invention is not limited to the particular constructions shown but it is the intention to hereby cover all adapations, modifications, and usages thereof which come within the practice of those skilled in the art to which the invention relates and the scope of the appended claims.

Having thus described my invention, what I claim is:

1. In apparatus for drying veneer, an elongated enclosure, conveyor means extending lengthwise of said enclosure for conveying veneer to be dried through said enclosure in a generally horizontal plane in a substantially flat condition, said conveyor means including first horizontally spaced rotatable support means extending transversely of the enclosure and disposed on one side of said plane, a plurality of endless conveying members extending lengthwise of said enclosure and spaced transversely from each other and trained over said first support means, each of said endless conveying member including a conveying reach extending between said first support means adjacent said horizontal plane and a return reach remote from said horizontal plane, second horizontally spaced rotatable support means extending transversely of said enclosure and disposed on the other side of said horizontal plane, a plurality of endless hold-down members extending lengthwise of said enclosure and spaced transversely from each other and trained over said second support means, each of said endless hold-down members including a hold-down reach extending between said second support means adjacent said horizontal plane and a return reach remote from said horizontal plane, takeup means for said endless members for maintaining a predetermined tension thereon, a plurality of rolls extending transversely of the lengths of said conveying and hold-down members and in engagement with the conveying reaches and return reaches of said conveying members and hold-down members respectively, sprockets connected to said rolls, and means for driving said first and second support means and said rolls including an endless sprocket chain one reach of which is in engagement with said sprockets connected to said rolls in engagement with the conveying reach of said conveying members and a second reach of which is in engagement with said sprockets connected to said rolls in engagement with the return reach of said hold-down members, a plurality of discrete elongated conduit means having their one ends open and their other ends closed, extending transversely of the length of said conveyor means on opposite sides of said horizontal plane in close proximity thereto, each of said conduit means including discharge means in the side thereof adjacent to said plane, means for circulating under pressure a drying medium through said conduit means and said discharge means to direct the flow of drying medium against opposite surfaces of veneer conveyed by said conveyor means, and means for heating said drying medium.

2. In apparatus for drying veneer: housing means having first and second tandemly arranged elongated chambers; a continuous-type conveyor system for conveying veneer through said chambers in a generally horizontal plane in a substantially flat condition: said conveyor system comprising, first and second horizontally spaced rotatable support means adjacent to opposite ends of said first chamber extending transversely of the length thereof and disposed on the lower side of said horizontal plane, an endless conveying member extending lengthwise of said first chamber trained over said first and second horizontally spaced support means, said endless conveying member including a conveying reach adapted to carry veneer extending between said first and second horizontally spaced support means adjacent said horizontal plane and a return reach below said horizontal plane, third and fourth horizontally spaced rotatable support means adjacent to opposite ends of said first chamber extending transversely of the direction of travel of veneer through said first chamber and disposed on the upper side of said horizontal plane, an endless hold-down member extending lengthwise of said first chamber trained over said third and fourth horizontally spaced support means, said endless hold-down member including a hold-down reach extending between said third and fourth horizontally spaced support means adjacent to said horizontal plane and a return reach above said horizontal plane, fifth and sixth horizontally rotatable support means adjacent to opposite ends of said second chamber extending transversely of the length thereof and disposed on the lower side of said horizontal plane, a second endless conveying member extending lengthwise of said second chamber trained over one of said third and fourth horizontal support means, said endless conveying member including a conveying reach adapted to carry veneer extending between said third and fourth horizontal support means adjacent to said horizontal plane and a return reach below said horizontal plane, seventh and eighth horizontally spaced rotatable support means adjacent to opposite ends of said second chamber extending transversely of the direction of travel of veneer through said second chamber and disposed on the upper side of said horizontal path, a second endless hold-down member extending lengthwise of said second chamber trained over said seventh and eighth horizontal support means, said second endless hold-down members including a hold-down reach extending between said fifth and sixth horizontally spaced support means adjacent to said horizontal plane and a return reach above said horizontal plane, said conveying and hold-down reaches of said endless members being adapted to normally engage opposite surfaces of veneer carried by said conveying reaches of said endless members; means for driving said continuous conveyor system to move said conveying reaches and said hold-down reaches of said endless members in the same direction; a plurality of discrete elongated conduit means in said chambers having their one ends open and their other ends closed extending transversely of the length of said endless members on opposite sides of said horizontal planes in close proximity thereto; each of said conduit means including discharge means in the side thereof adjacent to said planes; and means for circulating under pressure a gaseous medium through said conduit means and said discharge means and against opposite surfaces of veneer conveyed by said conveying reaches of said endless members.

3. In apparatus for drying veneer: housing means having first and second tandemly arranged elongated chambers each having an entrance and an exit end; a continuous-type conveyor system for conveying veneer through said chambers in a generally horizontal plane in a substantially flat condition; said conveyor system comprising, first rotatable support means adjacent to the entrance end of said first chamber extending transversely of the length thereof and disposed on the lower side of said horizontal plane, a second rotatable support means adjacent to the exit end of said first chamber extending transversely of the length thereof and disposed on the lower side of said plane, an endless conveying member extending lengthwise of said first chamber trained over said first and second support means, said endless conveying member including a conveying reach adapted to carry veneer extending between said first and second support means adjacent said horizontal plane and a return reach below said horizontal plane, third rotatable support means adjacent to the entrance end of said first chamber extending transversely of the direction of travel of veneer through said first chamber and disposed on the upper side of said horizontal plane, fourth rotatable support means adjacent to the entrance end of said first chamber extending transversely of the direction of travel of veneer through said first chamber and disposed on the lower said of said horizontal plane, and endless hold-down member extending lengthwise of said first chamber trained over said third and fourth support means, said endless hold-down member including a hold-down reach extending between said third and fourth support means adjacent to said horizontal plane and a return reach above said horizontal plane, fifth rotatable support means adjacent to one end of said second chamber extending transversely of the direction of travel of veneer through said chambers and disposed on the lower side of said horizontal plane, a second endless conveying member trained over said second and fifth support means having a conveying reach adapted to carry the veneer extending between said second and fifth support means adjacent to said horizontal plane and a return reach below said horizontal plane, a sixth rotatable support means adjacent to one end of said second chamber extending transversely of the direction of travel of veneer through said chambers and disposed on the upper side of said horizontal plane, a second endless hold-down member trained over said fourth and sixth support means having a hold-down reach extending between said fourth and sixth support means adjacent to said horizontal plane and a return reach above said horizontal plane, said conveying and hold-down reaches of said endless members being adapted to normally engage opposite surfaces of veneer carried by said conveying reaches of said endless members; means for driving said conveyor system to move said conveying reaches and said hold-down reaches of said endless members in the same direction; a plurality of discrete elongated conduit means in said chambers having their one ends open and their other ends closed extending transversely of the length of said endless members on opposite sides of said horizontal planes in close proximity thereto; each of said conduit means including discharge means in the side thereof adjacent to said planes; and means for circulating under pressure a gaseous medium through said conduit means and said discharge means and against opposite surfaces of veneer carried by said continuous-type conveyor.

References Cited

UNITED STATES PATENTS

| | | | |
|---|---|---|---|
| 835,843 | 11/1906 | Baetz | 34—162 |
| 1,642,928 | 9/1927 | Kocha | 34—205 XR |
| 1,958,341 | 5/1934 | Hurxthal | 198—165 |
| 2,718,386 | 8/1956 | Cobb | 34—66 XR |

FREDERICK L. MATTESON, Jr., *Primary Examiner.*

A. H. HERMANN, *Assistant Examiner.*

U.S. Cl. X.R.

34—162, 205; 198—165